(12) United States Patent
Liu et al.

(10) Patent No.: US 7,342,758 B2
(45) Date of Patent: Mar. 11, 2008

(54) METHOD AND SYSTEM FOR DETECTING STAND-ALONE OPERATION OF A DISTRIBUTED GENERATING SYSTEM

(75) Inventors: Yung-Hsiang Liu, Taipei (TW); Tain-Syh Luor, Chungho (TW); Shyh-Jier Huang, Tai Nan (TW); Jeu-Min Lin, Feng Shan (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 483 days.

(21) Appl. No.: 10/745,619

(22) Filed: Dec. 29, 2003

(65) Prior Publication Data

US 2005/0146224 A1    Jul. 7, 2005

(51) Int. Cl.
*H02H 3/27* (2006.01)
*H02H 3/46* (2006.01)
*H02H 7/22* (2006.01)

(52) U.S. Cl. ........................................ 361/62
(58) Field of Classification Search ................... 361/62
See application file for complete search history.

(56) References Cited

U.S. PATENT DOCUMENTS

| | | | |
|---|---|---|---|
| 5,262,958 A * | 11/1993 | Chui et al. ................ 702/75 |
| 5,493,485 A * | 2/1996 | Okado ..................... 363/56.01 |
| 5,842,156 A * | 11/1998 | Hong et al. ............... 702/179 |
| 6,107,784 A * | 8/2000 | Nomiya et al. ........... 323/205 |
| 6,172,889 B1 * | 1/2001 | Eguchi et al. ............ 363/95 |
| 6,219,623 B1 * | 4/2001 | Wills ........................ 702/60 |
| 6,275,619 B1 * | 8/2001 | Chui ......................... 382/248 |
| 6,429,546 B1 * | 8/2002 | Ropp et al. ............... 307/31 |
| 6,850,074 B2 * | 2/2005 | Adams et al. ............ 324/527 |
| 2002/0054694 A1 * | 5/2002 | Vachtsevanos et al. .... 382/111 |
| 2003/0080741 A1 * | 5/2003 | LeRow et al. ............ 324/320 |
| 2003/0147191 A1 * | 8/2003 | Deng et al. ............... 361/62 |
| 2003/0165036 A1 * | 9/2003 | Tuladhar ................... 361/62 |

* cited by examiner

*Primary Examiner*—Michael Sherry
*Assistant Examiner*—Ann T. Hoang
(74) *Attorney, Agent, or Firm*—Rabin & Berdo, P.C.

(57) ABSTRACT

A method and a system for detecting stand-alone operation of a distributed generating system having a generating source connected in shunt with an independent power distribution system via a first branch breaker are proposed. A voltage or a frequency signal on the independent power distribution system is read. The wavelet transformation is performed on the voltage or frequency signal to form a time versus high-frequency component window and a time versus low-frequency component window for conveniently detecting the perturbation in the time domain of the signal. Next, whether the absolute value of the high-frequency component is greater than a threshold value and whether the duration is longer than another threshold value are determined. If both answers are yes, a stand-alone operation occurs. An alarm signal is immediately generated and sent to the first branch breaker to release the connection between the generating source and the power distribution system.

13 Claims, 7 Drawing Sheets

METHOD AND SYSTEM FOR DETECTING STAND-ALONE OPERATION OF A DISTRIBUTED GENERATING SYSTEM

FIELD OF THE INVENTION

The present invention relates to a method and a system for detecting stand-alone operation of a distributed generating system and, more particularly, to a method and a system making use of the wavelet transformation to determine whether a distributed generating system has formed an independent power island that operates stand-alone.

BACKGROUND OF THE INVENTION

Liberalization of the power industry is the future trend of power development. Small distributed generating systems like cogeneration generating systems, solar generating systems and wind generating systems will also be integrated into the operation of the power distribution system in the future.

However, integrating distributed generating systems into the public electric power grid will affect the operation and control of the power system like the quality of the power distribution system, the possibility of stand-alone operation and the stability of the power system.

Figure 1:
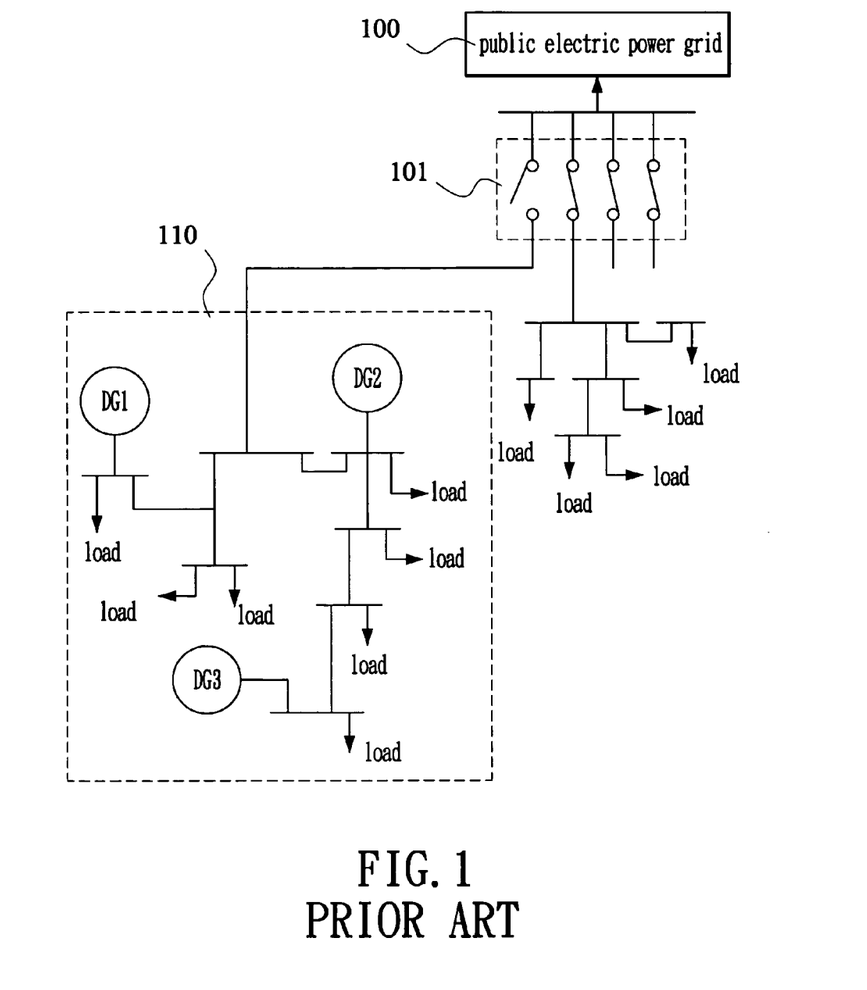
FIG. 1 is a power distribution architecture diagram of a conventional distributed generating system.

In particular, the stand-alone operation, which may happen after integrating distributed generating systems into the public electric power grid constitutes a large threat to the safety and stability of the power system. FIG. 1 is a power distribution architecture diagram of a conventional distributed generating system. In this power distribution mode, when a branch breaker 101 of a public electric power grid 100 is open-circuited, distributed generating systems DG1, DG2 and DG3 remain in the discharging state, i.e., forming independent power islands not controlled by the power company.

The problem is that distributed generating systems usually are private, and are not directly controlled by the power company. When the power company cuts off the electricity for any reason, each distributed generating system can't detect this situation and thus can't immediately separate from the public electric power grid 100, causing stand-alone operation of part of the power distribution system. If it is not carefully planned in advance, the coverage of this incident may expand to result in great damage.

The stand-alone operation of distributed generating systems usually occur when the total generating capacity is very close to the total load of the power distribution system. This phenomenon may cause the following harmful results.

1. Because the independent power island still provides power and hasn't been detected, maintenance men may be careless and compromise their labor safety.
2. The automatic restoration and shut down procedure of the power distribution system will be affected.
3. During the stand-alone operation, the voltage and frequency are unstable. That is, if the generating capacity of the distributed generating systems in the independent power island is lower than the total dissipated power, the system voltage and frequency will drop.

Therefore, the power specifications of advanced nations have prescribed that when the public electric power grid malfunctions or cuts off electricity, distributed generating systems ought to separate immediately from the public electric power grid to avoid an abnormal charging state of the public electric power grid.

However, for a conventionally used voltage/frequency protection relay, the variation of voltage and frequency on the power distribution system is indistinct because the distributed generating systems still provide power when the public electric power grid cuts off electricity. If the power distribution system has a motor load, the variation of voltage and frequency will be even more indistinct and insufficient to trigger the conventional protection relay, making a branch breaker unable to separate from the public electric power grid.

Recently, parameter monitoring techniques of the power system have been developed for stand-alone operation of distributed generating systems. Protection relays for stand-alone operation have been proposed for solving the dead angle problem of detection of the conventional voltage/frequency relays. These parameter monitoring techniques of the power system can be classified into passive detection methods and active detection methods.

Passive detection methods (e.g., phase change detection and frequency shift detection) are bases on system parameter variations to determine the occurrence of stand-alone operation. These methods have the advantage of low installation cost, but they can't detect stand-alone operation for the difference of supply and demand of the power distribution system in independent power island.

Active detection methods detect frequency variation and real power variation by adding a small perturbation in the output terminal of the generating system. When the system is normal, the public electric power grid is robust enough so that this small perturbation won't cause any problem. On the contrary, once the public electric power grid cuts off electricity, this small perturbation will cause a large variation of frequency or voltage to help the distributed generation system separate from the public electric power grid immediately. However, if there are many distributed generating systems integrated into the public electric power grid, it will be more difficult to grasp the accuracy of the added small perturbation, or the power supply of the system will even be unstable.

Accordingly, the present invention aims to propose a system for detecting stand-alone operation to detect accurately and quickly the occurrence of stand-alone operation.

SUMMARY OF THE INVENTION

An object of the present invention is to provide a method and a system for detecting stand-alone operation of a distributed generating system. The method and system makes use of the wavelet transformation to determine whether a distributed generating system has formed an independent power island that operates stand-alone. If the distributed generating system forms an independent power island that operates stand-alone, a generating source of the distributed generating system will be separated from the public electric power grid to accomplish the effect of prevention of stand-alone operation.

To achieve the above object, the present invention provides a method for detecting stand-alone operation of a distributed generating system having a generating source, which is connected to an independent power distribution system via a first branch breaker. In the detection method, a voltage signal or a frequency signal on the independent power distribution system is first read. The wavelet transformation is then performed on the voltage or frequency signal to form a time versus high-frequency component window and a time versus low-frequency component window for conveniently detecting the perturbation in the transient time domain of the signal. Next, whether the absolute value of the high-frequency component is greater than a threshold value and whether the duration is longer than another threshold value are determined. If both answers are yes, a stand-alone operation occurs. An alarm signal is then immediately generated and sent to the first branch breaker to drive the first branch breaker to release the parallel connection between the generating source and the power distribution system.

The present invention also provides a system for detecting stand-alone operation of a distributed generating system. The detection system comprises a generating source, a first branch breaker, a voltage/frequency input device and a calculating processing device. The first branch breaker is connected between the generating source and the independent power distribution system. The voltage/frequency input device is connected to the independent power distribution system and used to input a voltage signal or a frequency signal on the independent power distribution system into the calculating processing device, which is used for performing the wavelet transformation of the voltage or frequency signal to determine whether stand-alone operation occurs on the independent power distribution system. The first branch breaker will be controlled to release the parallel connection between the generating source and the independent power distribution system if stand-alone operation occurs on the independent power distribution system.

It is preferred that the wavelet transformation is used to decompose the voltage signal, the frequency signal, or both into a time versus high-frequency component window and a time versus low-frequency component window for convenient observation of perturbation in signal.

It is preferred that the occurrence of stand-alone operation is determined if the duration of perturbation is longer than a threshold value and the absolute value of the high-frequency component is higher than another threshold value after the wavelet transformation.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

The present invention makes use of the wavelet transformation to build a detection mechanism of stand-alone operation so that stand-alone operation can be immediately detected for separating distributed generating systems from the power distribution system.

The wavelet transformation makes a series of orders of decomposition to an input signal. The decomposed signal in any order includes important information for restoring to the signal in previous order. The wavelet transformation has the characteristic of simultaneous locating in the time domain. A frequency window can be used to limit the width in the time domain to narrow or widen automatically high- and low-frequency components. Therefore, the variation in a signal can be more accurately detected.

Figure 2:
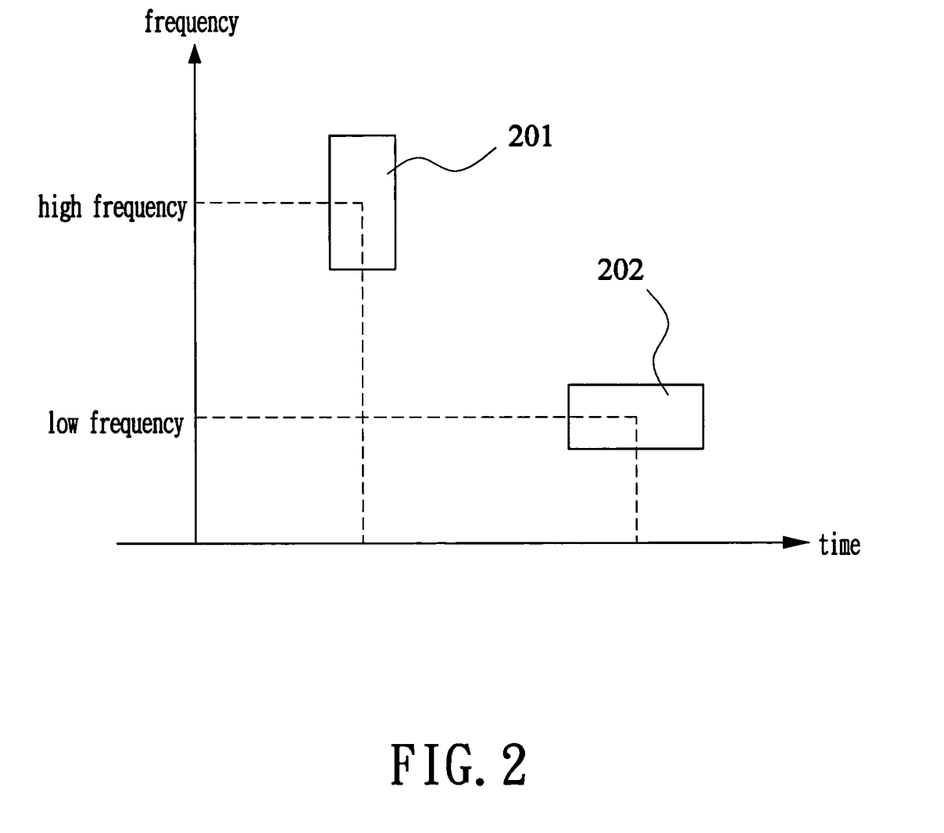
FIG. 2 is a diagram showing a time versus frequency window of the wavelet transformation.

FIG. 2 includes a time versus high-frequency component window 201 and a time versus low-frequency component window 202. The central height of the frequency component window is the frequency range of the signal to be detected. The diameter represents the resolution per unit time. It can be seen from FIG. 2 that the ratio of the diameter to the central frequency is a constant value. This means the wavelet transformation can automatically adjust the resolution according to the magnitude of frequency to be observed. Because the present invention only makes use of basic functions of the wavelet transformation to detect stand-alone operation of independent power islands, the theory derivation of basic functions of the wavelet transformation is not further described.

Figure 3:
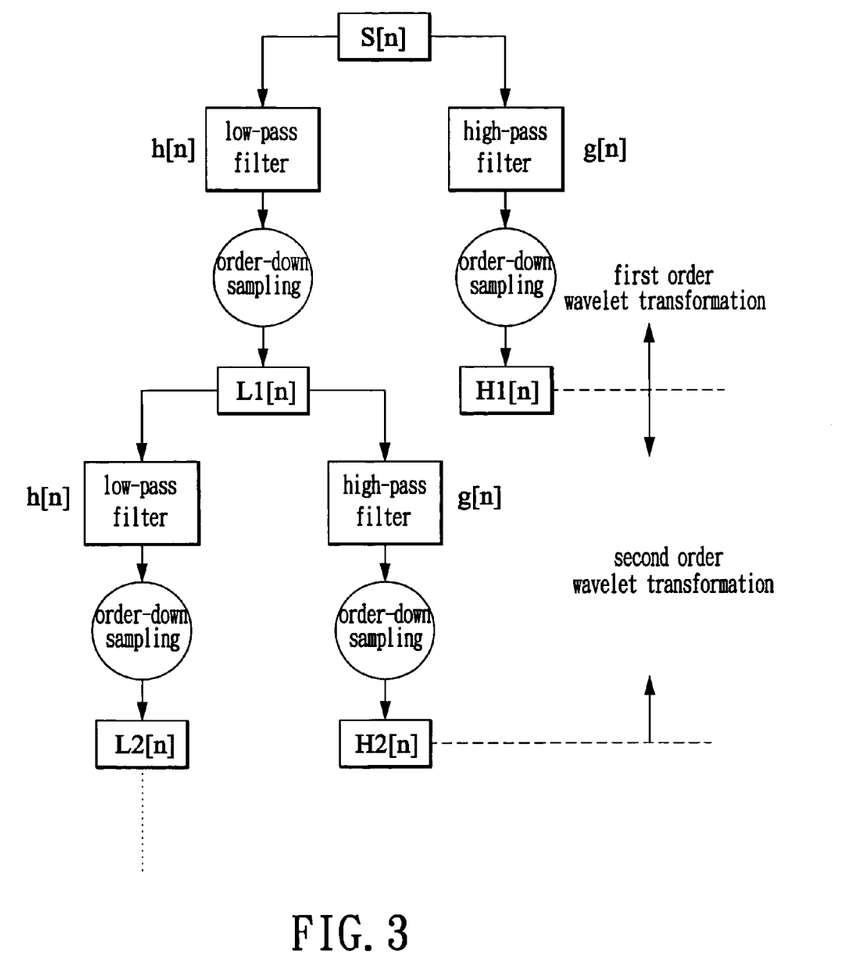
FIG. 3 is a diagram showing multiple frequency decomposition by means of the wavelet transformation.

As shown in FIG. 3, multiple decomposition of the wavelet transformation uses a low-pass filter h[n] and a high-pass filter g[n] to decomposes a voltage signal or a frequency signal S[n] into two sets of signals L1[n] and H1[n]. This is called the first-order wavelet transformation. Next, L1[n] is further decomposed into a low-frequency component L2[n] and a high-frequency component H2[n] in the same way. This is called the second-order wavelet transformation. For the signal analysis in the present invention, a three-order wavelet transformation is used, also with consideration of a first-order filtering.

Figure 4:
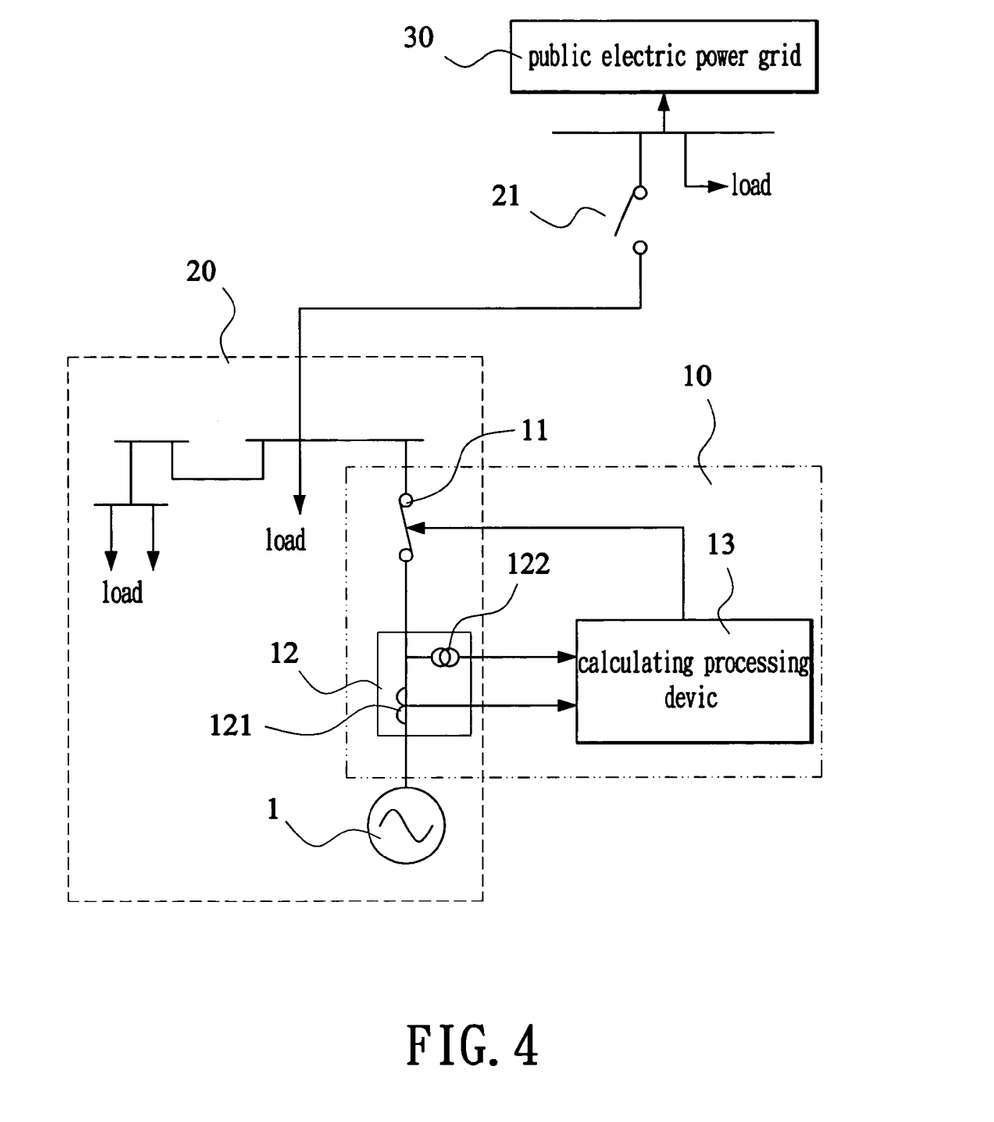
FIG. 4 is a system architecture diagram for detecting stand-alone operation of a distributed generating system of the present invention.

As shown in FIG. 4, a detection system 10 of the present invention is installed at a generating source 1 in a distributed generating system. The generating source 1 is connected in shunt with an independent power distribution system 20 of the distributed generating system via a first branch breaker 11, and is connected in shunt with a public electric power grid 30 via a second branch breaker 21. The second branch breaker 21 can be controlled by the power company to separate the public electric power grid 30 and the independent power distribution system 20. The first branch breaker 11 is controlled by the detection system 10 of the present invention to separate the generating source 1 and the independent power distribution system 20.

The detection system 10 further comprises a voltage/frequency input device 12 and a calculating processing device 13. The voltage/frequency input device 12 can be connected to the independent power distribution system 20 via a current comparator 121 and a voltage comparator 122 to input the voltage signal or frequency signal on the independent power distribution system 20 to the calculating processing device 13.

The calculating processing device 13 has a microprocessor for performing the wavelet transformation of the voltage signal or frequency signal on the independent power distribution system 20 to determine whether stand-alone operation occurs in the independent power distribution system 20 (e.g., the public electric power grid 30 malfunctions or cuts off electricity), thereby controlling the first branch breaker 11 to separate the generating source 1 from the independent power distribution system 20.

Figure 5:
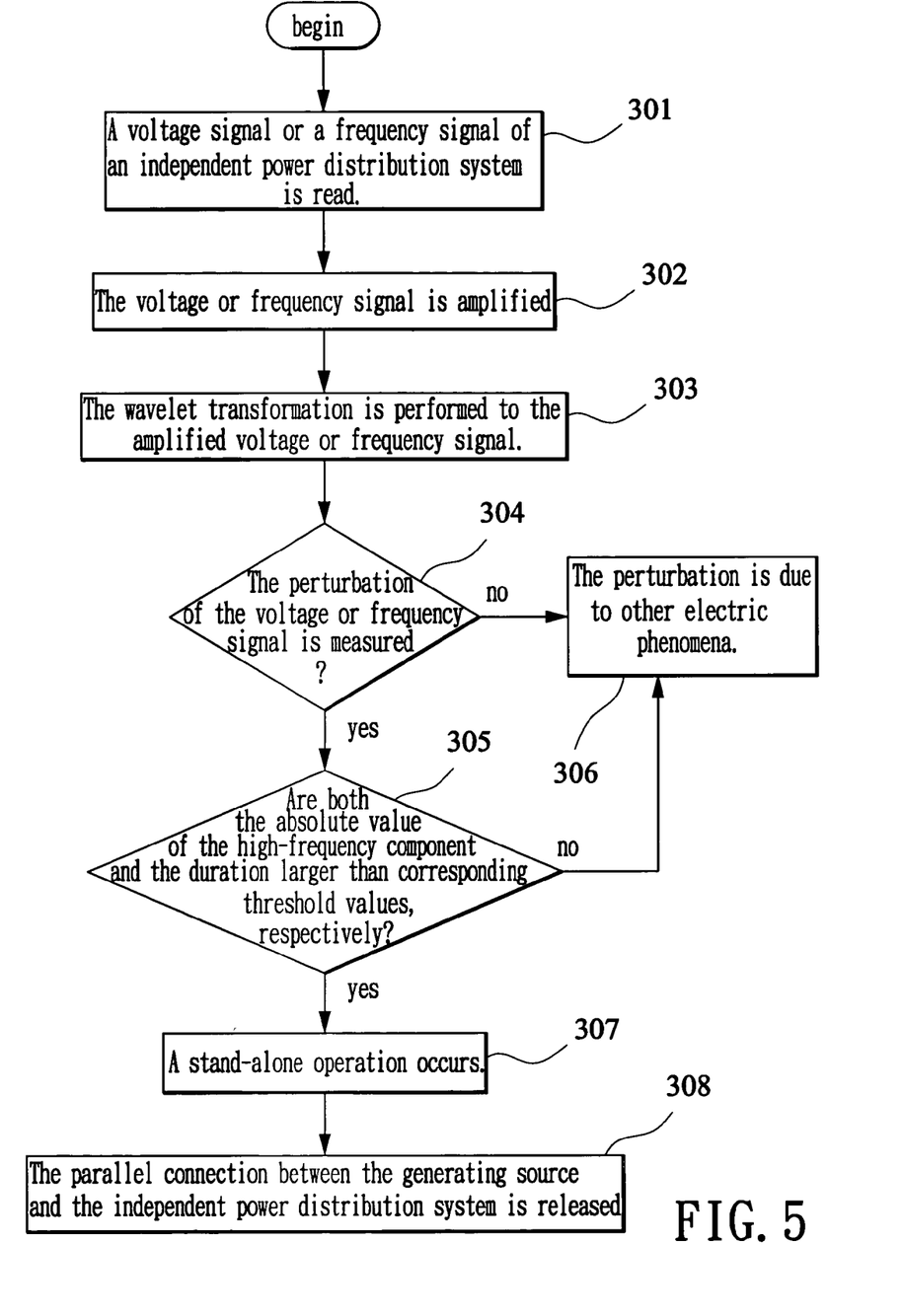
FIG. 5 is a flowchart for detecting stand-alone operation of the present invention.

FIG. 5 is a flowchart for detecting stand-alone operation of the present invention. First, a voltage signal or a frequency signal of the independent power distribution system is read (Step 301). The signal is then amplified (Step 302) to amplify the transient state of the signal for convenient observation of the high-frequency component after the wavelet transformation. Next, the wavelet transformation is performed to the amplified voltage or frequency signal for detecting abnormal situations (Step 303).

If the voltage waveform is abnormal, perturbation will occur in the time domain of the wavelet transformation due to the transient state of the waveform. Moreover, because the wavelet transformation has a good resolution capability for discontinuous signal variation, this variation can be manifested successfully even if the frequency varies only very slightly.

If there is perturbation in the voltage signal or the frequency signal or both of them, and the duration and the absolute value of the high-frequency component are greater than a threshold value and another threshold value, respectively, stand-alone operation occurs in the distributed power distribution system. Therefore, it is necessary to separate the distributed generating system and the public electric power grid. The threshold values are set to enhance the accuracy for determining stand-alone operation. The threshold values can be properly adjusted according to the characteristics of the distributed generating system. In the present invention, it is preferred that the time threshold value is set to 0.13 sec and the threshold value for the absolute value of the high-frequency component is set to 0.01.

When the microprocessor detects that perturbation is occurring in the voltage signal or the frequency signal (Step 304), monitoring of stand-alone operation is immediately conducted (Step 305). If both the duration and the absolute value of the high-frequency component are not higher than the corresponding threshold values, respectively, the perturbation is due to other electric phenomena (Step 306). If both the duration and the absolute value of the high-frequency component are greater than the corresponding threshold values, respectively (Step 307), stand-alone operation occurs, and the calculating processing device 13 immediately sends an alarm signal to the first branch breaker 11 to drive the first branch breaker 11 to release the parallel connection between the generating source and the power distribution system (Step 308).

Finally, the feasibility of the present invention is tested. In the tested distributed generating system, the rated voltage is 110V, the operating frequency is 60 Hz, and the number of sampling points per second of the voltage signal and the frequency signal is 7680.

Figure 6A:
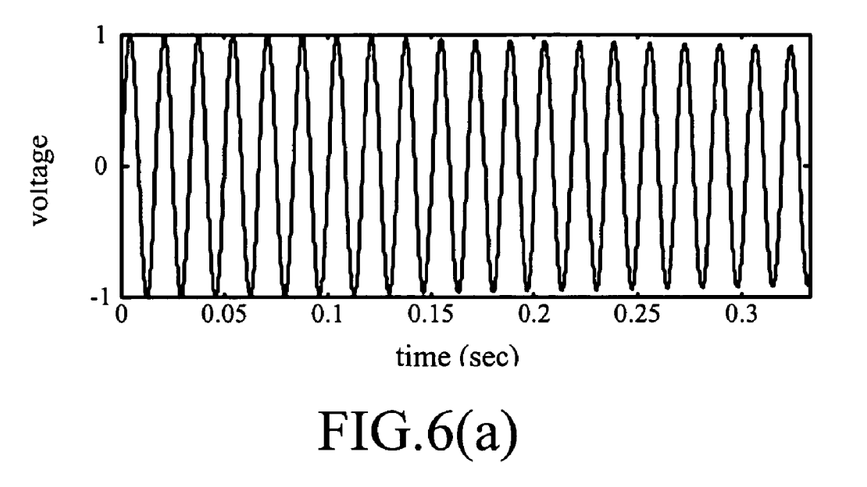
FIGS. 6(a) and 6(b) are diagrams of voltage and frequency versus time within an independent power distribution system.
Figure 6B:
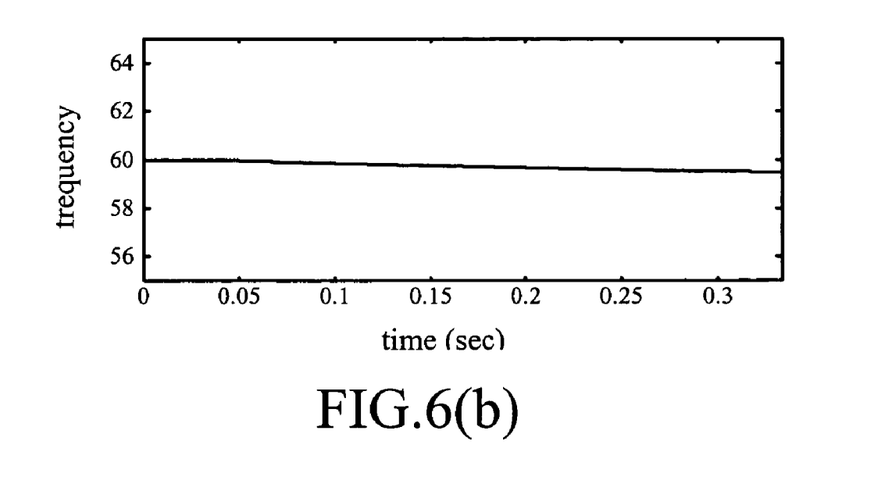

As shown in FIGS. 6(a) and 6(b), if a stand-alone operation event occurs at t=0.05 sec, both the voltage and the frequency will drop. At t=0.3333 sec, the amplitude of voltage gradually decreases to 0.915 pu, and the frequency drops to 59.5 Hz. However, the variations of these signals are small and hard to detect for driving the conventional voltage type and frequency type relay to function.

Figure 7A:
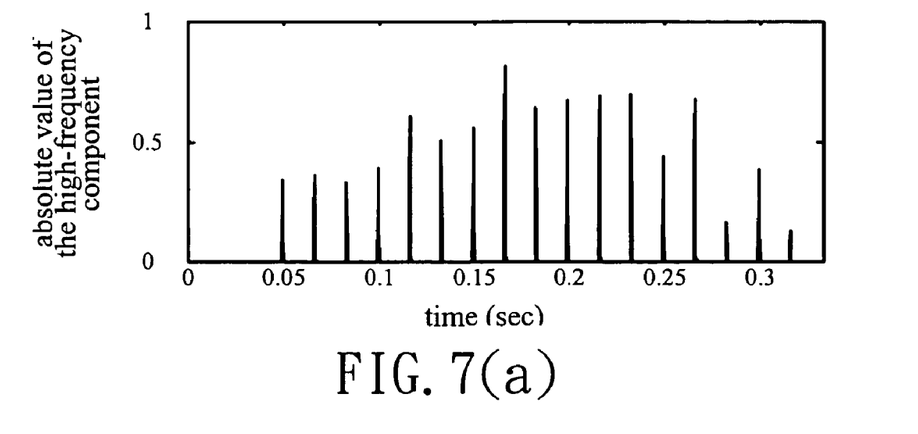
FIGS. 7(a) and 7(b) are diagrams of the absolute values of the high-frequency components versus time of the voltage and frequency signals when using the wavelet transformation.
Figure 7B:
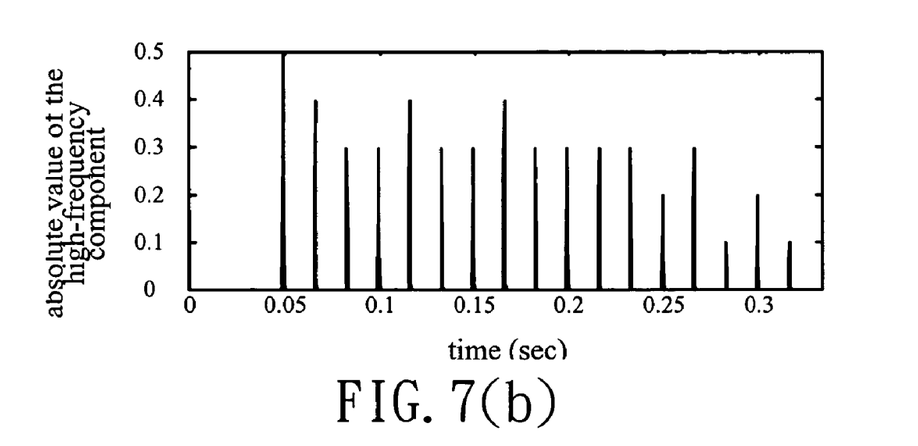

If the detection method of the present invention is used, the results of which are shown in FIGS. 7(a) and 7(b), high-frequency components will occur during the abnormal drop period of voltage in FIG. 7(a). Also, drastic perturbation occurs in the frequency signal after t=0.05 sec in FIG. 7(b). To sum up, both the absolute values of high-frequency components of the voltage and frequency signals are larger than 0.01 and last for more than 0.13 sec from t=0.05 sec. It can thus be determined that stand-alone operation occurs in the distributed generating system.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A method for detecting stand-alone operation of a distributed generating system, said distributed generating system having a generating source connected in shunt with an independent power distribution system via a first branch breaker, said method comprising the steps of:
    a. reading a voltage signal or a frequency signal on said independent power distribution system;
    b. performing a wavelet transformation to the signal read in step a to form high and low frequency components of the transformed signal, a time versus high-frequency component window for the high frequency component and a time versus low-frequency component window for the low frequency component for detecting a perturbation in a transient time domain of said read signal;
    c. determining whether an absolute amplitude value of the high-frequency component is greater than an amplitude threshold value and whether the amplitude threshold value is exceeded for a duration longer than a time threshold value and deciding that a stand-alone operation occurs if both answers are yes; and
    d. generating an alarm signal and sending said alarm signal to said first branch breaker to drive said first branch breaker to release a parallel connection between said generating source and said power distribution system.

2. The method for detecting stand-alone operation of a distributed generating system as claimed in claim 1, wherein a voltage comparator is used to input said read signal to said power distribution system.

3. The method for detecting stand-alone operation of a distributed generating system as claimed in claim 1, further comprising the following step after said Step a:
    a. amplifying said read signal for observation of the high-frequency component of the wavelet transformation.

4. The method for detecting stand-alone operation of a distributed generating system as claimed in claim 1, wherein perturbation in said read signal is detected in said Step b.

5. The method for detecting stand-alone operation of a distributed generating system as claimed in claim 1, wherein said time threshold value is set to 0.13 sec and said amplitude threshold value for the absolute value of the high-frequency component is set to 0.01.

6. The method for detecting stand-alone operation of a distributed generating system as claimed in claim 1, wherein the perturbation is determined to be due to other electric phenomena if said perturbation is not greater than said amplitude threshold value.

7. The method for detecting stand-alone operation of a distributed generating system as claimed in claim 1, further comprising the following step before said Step a:

a". introducing a perturbation to at least a frequency or a voltage of said generator source.

8. A system for detecting stand-alone operation of a distributed generating system, said distributed generating system forming an independent power distribution system connected in shunt with a public electric power grid, said detection system comprising:
- a generating source for providing power for said independent power distribution system;
- a first branch breaker connected between said generating source and said independent power distribution system;
- a voltage/frequency input device connected to said independent power distribution system and used to input a read signal, which is either a voltage signal or a frequency signal, in said independent power distribution system; and
- a calculating processing device for performing a wavelet transformation of said read signal on said independent power distribution system to determine whether stand-alone operation occurs on said independent power distribution system, said first branch breaker being controlled to release a parallel connection between said generating source and said independent power distribution system if stand-alone operation occurs on said independent power distribution; wherein:
- said, calculating processing device includes means for decomposing said read signal into a high-frequency component and a low frequency component by the wavelet transformation for observation of a perturbation, and means for determining a stand-alone operation to be occurring in said distributed generating system if an absolute amplitude value of the high-frequency component is greater than an amplitude threshold value for a duration greater than a time threshold value.

9. The system for detecting stand-alone operation of a distributed generating system as claimed in claim 8, wherein said distributed generating system is a cogeneration generating system, a solar generating system or a wind generating system.

10. The system for detecting stand-alone operation of a distributed generating system as claimed in claim 8, further comprising a second branch breaker connected between said independent power distribution system and said public electric power grid, said second branch breaker being controlled by the power company to release a connection between said independent power distribution system and said public electric power grid.

11. The system for detecting stand-alone operation of a distributed generating system as claimed in claim 8, wherein said voltage/frequency input device is a voltage comparator.

12. The system for detecting stand-alone operation of a distributed generating system as claimed in claim 8, wherein said calculating processing device has a microprocessor.

13. The system for detecting stand-alone operation of a distributed generating system as claimed in claim 8, wherein said time threshold value is set to 0.13 sec, and said amplitude threshold value for the absolute value of the high-frequency component is set to 0.01.

* * * * *